Patented Apr. 14, 1925.

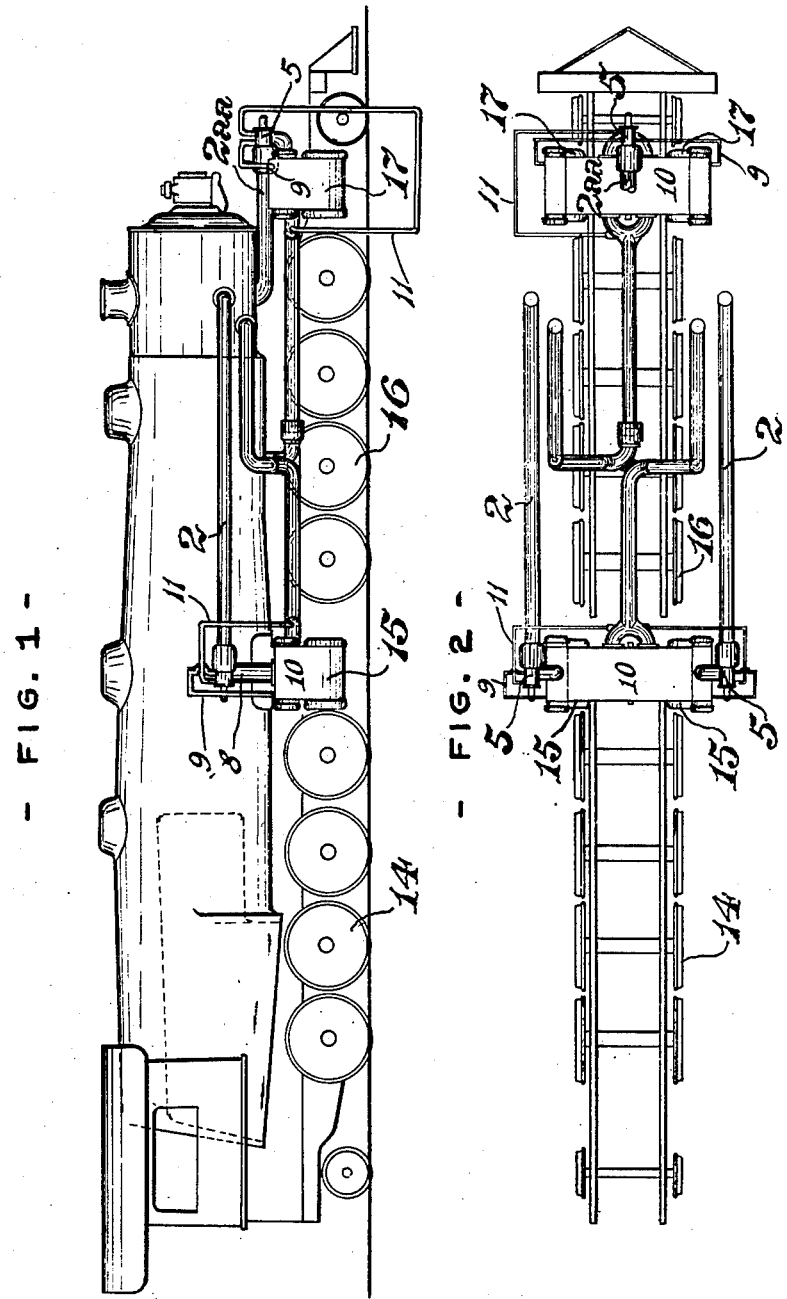

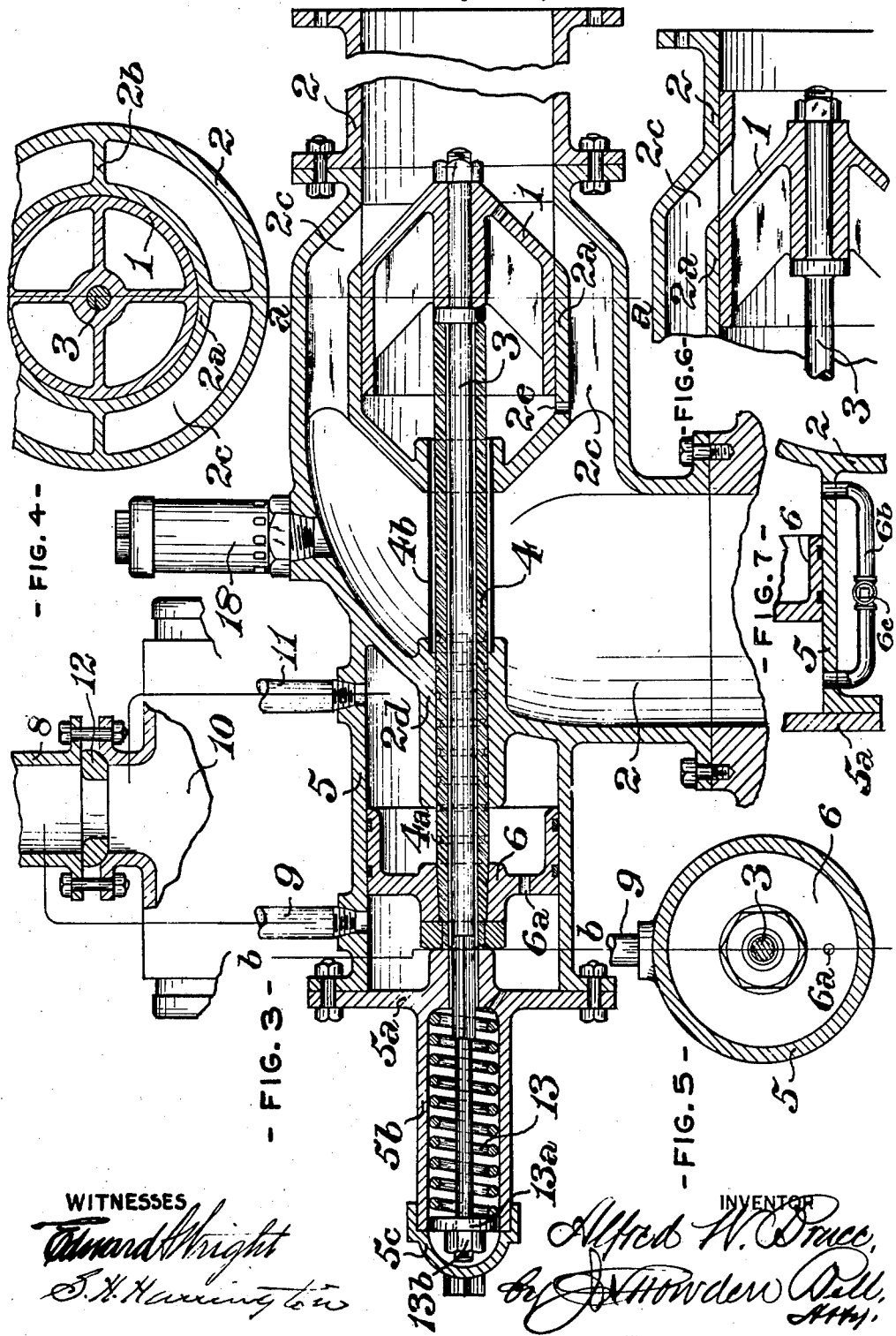

1,533,304

UNITED STATES PATENT OFFICE.

ALFRED W. BRUCE, OF NEW YORK, N. Y.

SPEED-CONTROL APPLIANCE FOR FLUID-PRESSURE ENGINES.

Application filed April 25, 1923. Serial No. 634,481.

*To all whom it may concern:*

Be it known that I, ALFRED W. BRUCE, a citizen of the United States, and resident of New York, in the county and State of New York, have invented a certain new and useful Improvement in Speed-Control Appliances for Fluid-Pressure Engines, of which improvement the following is a specification.

My invention relates to means for preventing the undue and objectionable increase of speed of a fluid pressure engine upon a sudden and unintentional decrease in load resistance, and its object is to provide an appliance of simple and inexpensive construction, and ready applicability for the automatic prevention of such result.

To this end, my invention, broadly and generally stated, consists in the combination, with a conduit for the supply or exhaust of motive fluid, to or from a fluid pressure engine, of an automatically operative choke or restricting valve, controlling the flow of fluid through said conduit, and a differential pressure piston connected to said valve, and subject, on its opposite sides, to pressure from the supply conduit of the engine and from the valve chest thereof, respectively.

The improvement claimed is hereinafter fully set forth.

The liability to serious personal injury and damage to property, by the sudden increase of speed of a fluid pressure engine upon a total or partial unintentional release of load resistance, as in the case of a steam vessel pitching in a heavy sea, has long been well recognized, and governing mechanism, of various designs, has been applied, with a greater or less degree of success, to counteract it. Among other instances, of frequent occurrence, may be mentioned the slipping of one of the systems of driving wheels of a simple Mallet locomotive engine, in which case it becomes necessary to shut off the steam supply to the cylinders of both systems, in order to stop the slipping of the wheels of the system in which slipping first occurs. This acts to slow down the train, and, upon a heavy grade, may stall it completely.

My invention has not been designed to act as a speed governor for substantially close regulation, but as a safety appliance for special service, to prevent accident or delay, particularly as in the instance last above noted.

In the accompanying drawings: Figure 1 is a diagrammatic side view of a Mallet locomotive engine, illustrating an application of my invention; Fig. 2, a plan or top view of the same, with the boiler removed; Fig. 3, a longitudinal central section through a speed control appliance, embodying my invention; Fig. 4, a partial transverse section, on the line $a\ a$ of Fig. 3; Fig. 5, a similar section, on the line $b\ b$ of Fig. 3; Fig. 6, a partial longitudinal section through the restricting valve; and, Fig. 7, a partial section through the piston chamber, showing a form of by-pass.

In the practice of my invention, referring descriptively to the specific embodiment thereof which is herein exemplified, a choke or restricting valve, 1, is fitted in a fluid pressure conduit, 2, which may be either the supply or the exhaust pipe of a fluid pressure engine of any of the various types known in practice. In the instance illustrated, the restricting valve is hollow and of conical form, and works in a casing, $2^a$, concentric with the conduit, with which it is connected by radial ribs, $2^b$. An annular passage, $2^c$, the capacity of which for the traverse of fluid is controlled by the position of the restricting valve, is interposed between the casing, $2^a$, and the wall of the conduit, 2. The sectional area of the passage, $2^c$, is made sufficiently great to provide, when unrestricted, for the traverse of the volume of motive fluid required in the operation of the engine at its maximum designed speed.

The restricting valve, 1, is fixed upon a stem, 3, connected to, and surrounded by, a sleeve, 4, which is provided with suitable packing grooves, $4^a$, and passes through a bearing, $2^d$, on the conduit, into a chamber, 5, formed in the conduit, in which chamber a differential pressure piston, 6, is truly fitted. The outer end of the sleeve, 4, is secured to said piston, and leakage of fluid from the conduit into the piston chamber, is prevented by a tube, $4^b$, extending around the sleeve, 4, from the casing, $2^a$, to the bearing, $2^d$. Continuous communication between the interior of the casing, $2^a$, and the conduit, is established by a small port, 2ᵉ, in the wall of the casing. A relief valve, 18, of any suitable and preferred construction, may be connected to the conduit, 2, between the supply end thereof and the restricting valve, 1.

The piston chamber, 5, communicates, on one side of the differential pressure piston, 6, with the supply pipe, 8, of the engine, by a pipe, 9, and communicates, on the opposite side of the piston, with the valve chest, 10, of the engine, by a pipe, 11, as near to the admission valve as practicable. The capacity of the supply pipe, 8, is reduced, between the connections of the pipes, 9 and 11, by a ring, 12, of smaller diameter, fitted in the supply pipe, and in order to admit of the automatic restoration of pressure, when the appliance is installed in the supply pipe of the engine, a continuously open by-pass, between the opposite ends of the piston chamber, is, in such case, provided. The by-pass may be either a small port, 6ᵃ, formed in the differential piston, 6, as shown in Fig. 3, or a corresponding pipe, 6ᵇ, extending from one end of the chamber, and adjustably controlled by a cock or valve, 6ᶜ, as shown in Fig. 7.

The outer end of the piston chamber, 5, is closed by a detachable head, 5ᵃ, on which is formed a casing, 5ᵇ, the outer end of which is closed by a removable cap, 5ᶜ. A helical spring, 13, enclosed in the casing, 5ᵇ, surrounds the valve stem, 3, and bears, at one end, on the head, 5ᵃ, of the piston chamber, and, at the other, on a washer, 13ᵃ, secured, adjustably, on the outer end of the valve stem, 3, by a nut, 13ᵇ. The tension of the spring, 13, acts, when unopposed by a greater force, to move the restricting valve, 1, to, and maintain it in, the position shown in Figs. 3 and 6, in which position it exerts no resistance to the passage of fluid through the conduit, 2.

Figs. 1 and 2 illustrate the application of my invention in a simple Mallet locomotive engine, which, as in ordinary practice, is equipped with a rear system of driving wheels, 14, which are rotated by the pistons of a pair of steam cylinders, 15, and a forward system of driving wheels, 16, which are independently rotated by the pistons of a pair of cylinders, 17. In such application, an appliance, substantially as hereinbefore described, and as shown in Figs. 3 to 6 inclusive, is connected with each of the exhaust pipes, 2, of the cylinders of the rear system, and a similar appliance is connected with the exhaust pipe, 2ᵃᵃ, of the cylinders of the forward system.

In the operation of my invention, when applied in the fluid pressure supply line of an engine, the sudden release of load resistance, from any cause, immediately results in increased speed or racing of the engine, which is accompanied by a reduction of valve chest pressure, relatively to the normal pressure on the supply line between the boiler and the reducing ring, 12, therein, the latter pressure reducing more slowly, by reason of the greater volume of the pipe above said ring, and the reduction of transverse area caused by the latter. The chamber of the differential pressure piston being piped, at one end, to the valve chamber, and at the other, to the supply line, above the reducing ring, the pressure on the valve chamber side of the piston is reduced, causing the piston to move to the right and the connected restricting valve to reduce the pressure in the engine sufficiently to reduce the excess of speed to the normal degree. Upon the equalization of pressure on opposite sides of the piston, the piston and restricting valve are moved to normal position by the spring, 13, and the normal supply of motive fluid to the engine is restored.

In the case in which the restricting valve is applied in the exhaust passage of the engine, its increase in speed by sudden release of load resistance, is counteracted by the increase in back pressure, resultant upon the movement of the differential pressure piston and restricting valve, which is effected by the same difference in supply line and valve chest pressures, as when the appliance is located in the supply line.

It will be seen that my invention involves comparatively slight cost of construction and maintenance, and that it is readily applicable in any of the various constructions which are known in present standard practice. Among its advantages there may be noted, (a), the automatic shutting down of fluid pressure engines, of either the reciprocating or the rotary type, upon sudden relief of load resistance, as in locomotives, on the slipping of the driving wheels; in marine engines, when the screw propeller is lifted out of the water by the pitching of the ship; and in stationary engines, on accidental removal of the load; (b), the automatic restoration of operative fluid pressure, when the resistance of the load is restored; and, (c), the automatic stoppage of the slipping of either system of driving wheels of a Mallet locomotive, without shutting off steam from both systems, thereby obviating liability to stalling the train, and largely reducing the necessity of constant attention of the engine crew to prevent objectionable results of slipping on grades.

I claim as my invention and desire to secure by Letters Patent:

1. In a speed control appliance for fluid pressure engines, the combination, with a motive fluid conduit, of a valve chest; a reducing ring, fitted in the conduit, between the source of fluid supply and the valve chest; an automatically operable choke or restricting valve, controlling flow of fluid through the conduit; and a differential pressure piston, connected to said valve, and subject, on its opposite sides, to pressure from the conduit, taken between the reducing ring and the source of supply, and from the valve chest, respectively.

2. In a speed control appliance for fluid pressure engines, the combination, with a motive fluid conduit, of an automatically operable choke or restricting valve, controlling flow of fluid through said conduit; a differential pressure piston, connected to said valve, and subject, on opposite sides, to pressure from the source of supply of the engine and from the valve chest thereof, respectively; and a by-pass, establishing communication between the opposite sides of said piston.

3. In a speed control appliance for fluid pressure engines, the combination, with a motive fluid conduit, of a cylindrical casing, fixed, concentrically, in said conduit; a choke or restricting valve, controlling the annular passage between said casing and the wall of the conduit; a stem, on which said valve is secured; a piston chamber, connected to the exterior of the conduit; a differential pressure piston, fitted in said chamber and secured to the valve stem; and a spring, fitted in a casing on the piston chamber and exerting tension on the valve stem, in direction to impart opening movement to the restricting valve.

4. In a speed control appliance for locomotive engines of the Mallet type, the combination, with a cylinder exhaust pipe, of a choke valve in said pipe, means to normally hold said valve inoperative, a differential piston directly connected to said valve, connections whereby the opposite faces of said piston are subjected, respectively, to the pressure of the source of supply and that in the valve chest, and a reducing ring in the conduit between the source of supply and the valve chest.

5. In a speed control appliance for locomotive engines of the Mallet type, the combination, with the exhaust pipes of the forward and rear cylinders, of choke-valves in said pipes, means to normally hold said valves inoperative, differential pistons connected to said valves, connections whereby the opposite faces of said pistons are subjected, respectively, to the pressures of the source of supply and those in the valve chests, and a reducing ring in the conduit between the source of supply and the valve chest.

ALFRED W. BRUCE.

Witnesses:
CONGER MUNSON,
F. A. WADSWORTH.